US007198570B2

(12) United States Patent
Rodgers et al.

(10) Patent No.: US 7,198,570 B2
(45) **Date of Patent: *Apr. 3, 2007**

(54) GAMING DEVICE HAVING A BONUS AWARD WHEEL WITH A TERMINATOR

(75) Inventors: Paulina Rodgers, Reno, NV (US); Anthony J. Baerlocher, Reno, NV (US)

(73) Assignee: IGT, Reno, NV (US)

(*) Notice: Subject to any disclaimer, the term of this patent is extended or adjusted under 35 U.S.C. 154(b) by 563 days.

This patent is subject to a terminal disclaimer.

(21) Appl. No.: 10/183,892

(22) Filed: Jun. 27, 2002

(65) Prior Publication Data

US 2004/0002372 A1 Jan. 1, 2004

(51) Int. Cl.
*A63F 13/00* (2006.01)

(52) U.S. Cl. .......................................... 463/20; 463/16

(58) Field of Classification Search .................... 463/1, 463/11–25, 40–42

See application file for complete search history.

(56) References Cited

U.S. PATENT DOCUMENTS

| | | | | |
|---|---|---|---|---|
| 4,732,386 | A | 3/1988 | Rayfiel | |
| 5,318,298 | A * | 6/1994 | Kelly et al. | 273/122 R |
| 5,788,573 | A | 8/1998 | Baerlocher et al. | |
| 5,823,874 | A | 10/1998 | Adams | |
| 5,830,069 | A * | 11/1998 | Soltesz et al. | 463/42 |
| 5,848,932 | A | 12/1998 | Adams | |
| 5,882,261 | A | 3/1999 | Adams | |
| 5,911,418 | A | 6/1999 | Adams | |
| 5,934,672 | A | 8/1999 | Sines et al. | |
| 5,947,820 | A | 9/1999 | Morro et al. | |
| 6,024,642 | A | 2/2000 | Stupak | |
| 6,059,658 | A | 5/2000 | Mangano et al. | |
| 6,089,978 | A | 7/2000 | Adams | |
| 6,142,873 | A | 11/2000 | Weiss et al. | |
| 6,159,098 | A | 12/2000 | Slomiany et al. | |
| 6,162,121 | A | 12/2000 | Morro et al. | |
| 6,168,520 | B1 | 1/2001 | Baerlocher et al. | |
| 6,190,255 | B1 | 2/2001 | Thomas et al. | |
| 6,224,483 | B1 | 5/2001 | Mayeroff | |
| 6,315,660 | B1 * | 11/2001 | DeMar et al. | 463/16 |
| 6,322,309 | B1 * | 11/2001 | Thomas et al. | 413/20 |
| 6,334,814 | B1 | 1/2002 | Adams | |
| 6,336,863 | B1 | 1/2002 | Baerlocher et al. | |
| 6,398,218 | B1 | 6/2002 | Vancura | |
| 6,705,944 | B2 * | 3/2004 | Luciano | 463/20 |

FOREIGN PATENT DOCUMENTS

EP 0 874 337 A1 3/1998

(Continued)

OTHER PUBLICATIONS

Wheel of Fortune. last modified Jan. 2006, http://en.wikipedia.org/wiki/Wheel_of_Fortune.*

(Continued)

*Primary Examiner*—Xuan M. Thai
*Assistant Examiner*—Ross A. Williams
(74) *Attorney, Agent, or Firm*—Bell, Boyd & Lloyd LLP

(57) ABSTRACT

A gaming device including an award wheel having multiple sections including a plurality of award symbols and at least one terminator symbol, a section indicator, a spin initiator and a processor connected to the award wheel and the spin initiator. The player, or the gaming device, spins the award wheel using a spin initiator. The gaming device provides an award to the player, if the section indicator indicates that the player obtained an award. The player continues to spin the award wheel until the section indicator indicates that the player obtained a terminator, which ends the bonus game and the player receives the total accumulated award.

40 Claims, 10 Drawing Sheets

FOREIGN PATENT DOCUMENTS

| | | | | |
|---|---|---|---|---|
| EP | 0 945 837 | A2 | | 3/1999 |
| EP | 0 984 409 | A2 | | 9/1999 |
| GB | 2201821 | A | * | 9/1988 |

OTHER PUBLICATIONS

Wheel Of Fortune America's game comes to the PC, written by Tal Blevins Dec. 1, 1998, http://pc.ign.com/articles/160/160570p1.html.*
Big Bank Piggy Bankin' Advertisement written by WMS Gaming, Inc., published prior to 2000.
Diablo Diamond Game Advertisement written by IGT, available prior to 2002.
Monopoly Brochures and Articles written by WMS Gaming, Inc., published 1998, 1999, and 2000.
Wheel of Fortune Advertisement written by IGT, published prior to 2000.
Wheel of Fortune Video Advertisement written by IGT, published prior to 2000.
Wheel of Fortune Advertisement written by IGT, published in 1998.
Progressive Wheel of Fortune Advertisement written by IGT, published in 1997.
Mega Jackpots Wheel of Fortune Advertisement written by IGT, published prior to 2000.
Bingo Spins Article written by Strictly Slots, published in 2001.
Run For Your Money Advertisement written by IGT, published in 1998.
Texas Tea Advertisement written by IGT, published in 2000.

* cited by examiner

GAMING DEVICE HAVING A BONUS AWARD WHEEL WITH A TERMINATOR

CROSS-REFERENCE TO RELATED APPLICATIONS

This application is related to the following commonly-owned co-pending patent applications: "GAMING DEVICE HAVING INDEPENDENT BONUS REELS," Ser. No. 09/967,266.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

DESCRIPTION

The present invention relates in general to a gaming device, and more particularly to a gaming device having a bonus award wheel with a terminator.

BACKGROUND OF THE INVENTION

Gaming device manufacturers strive to make gaming devices that provide as much enjoyment and excitement as possible. Providing a bonus game in which a player has an opportunity to win potentially large awards or credits in addition to the awards associated with the base game of the gaming device is one way to enhance player enjoyment and excitement.

Known gaming devices having bonus games employ a triggering event that occurs during play of the base game operation of the gaming device. The triggering event temporarily stalls or halts the base game play and enables a player to enter a second, different game, which is the bonus game. The player plays the bonus game, likely receives an award, and returns to the base game. In most instances, the bonus game is relatively short in relation to the time that the player spends repeatedly playing the base game. The player may play the bonus game several times while playing the base game of the gaming device.

One known bonus game is the "WHEEL OF FORTUNE" gaming device manufactured by the assignee of this application. In this game, a multi-colored award wheel is attached to a gaming device. The award wheel is divided into several sections. Each section includes an award that ranges in value from twenty-five to one thousand. In this game, a player plays a base game that includes spinning reels and a central payline. When the wheel symbol is positioned along the central payline on the third reel, the player enters the bonus game.

In the bonus game, the player obtains one opportunity or spin of the award wheel. The player spins the award wheel by pressing a button on the gaming device. Once the award wheel starts spinning, the player waits until it stops. An indicator located at the top of the award wheel points to a section of the wheel. The player receives the award on that section for the bonus game. After the player receives that award, the bonus game ends and the player may resume playing the base game.

Other types of bonus games are described in European Patent No. EP 0874337A1, EP 0945837A2 and EP 0984409A2, each of which are assigned to WMS Gaming, Inc. These games are generally versions of a "Do Until" type bonus game.

Patent No. EP 0874337A1 discloses a gaming device having a bonus game where the player spins a plurality of reels including several symbols. In the bonus game, if the player obtains a winning symbol combination on the reels, the player receives an award and spins again. The probability for obtaining a winning symbol combination on the reels is greater than fifty percent. Therefore, a player will likely have multiple opportunities to spin the reels in the bonus game and receive several awards. If the player does not obtain a winning symbol combination, the bonus game ends and the player receives the total accumulated award for the game. Thus, the player spins the reels in the bonus game until they do not obtain a winning combination.

Patent No. EP 0984409A2 discloses a gaming device wherein the game enables the player to spin a plurality of reels having various symbols attempting to obtain awards. In this bonus game, the player starts the bonus game with a limited number of spins. Then, the player spins the reels until there are no spins remaining. The player receives an award after each spin. The final award in the bonus game is the total of all of the accumulated awards by the player in the game.

Patent No. EP 09454837A2 discloses a gaming device wherein the game presents the player with a plurality of selections in the bonus game. The selections include masked or hidden awards and end bonus outcomes or terminators. The player receives an award for each selection picked by a player that is not a terminator. The player continues to pick selections until the player selects a terminator. The terminator ends the bonus game and the player receives the total of all the awards they obtained during the game.

The above gaming machines employ a "Do-Until" style bonus game where a player spins reels or picks from a player selectable grid or board until the player obtains a terminator or runs out of picks. In these games players can obtain multiple awards. However, these games do not provide an award wheel having the "do-until" bonus scheme of the present invention.

SUMMARY OF THE INVENTION

The present invention provides a gaming device and in particular a bonus scheme of a gaming device that enables players to accumulate awards by spinning an award wheel having a plurality of award symbols and at least one terminator or terminator symbol. The gaming device provides the player with an award associated with the award symbol indicated in each spin of the award wheel until the terminator or terminator symbol is indicated. When the terminator or terminator symbol is indicated, the game provides the total awards accumulated prior to that spin to the player and the bonus game ends.

In one embodiment, the award wheel has multiple award symbols that vary in value, and at least one terminator. Preferably, an indicator is located along the outer edge of the award wheel to designate whether the player receives an award symbol or a terminator symbol. Although in this embodiment the indicator is located along the outer edge of the award wheel, it should be appreciated that the indicator may be any method or device used to highlight a symbol on the award wheel such as an illumination device which lights up the indicated symbol. A player spins the wheel by pressing a button, touching a display screen or by any other suitable method.

In another embodiment, the award wheel has multiple terminators. The additional terminators or terminator symbols increase the likelihood that a player will receive a terminator.

In yet another embodiment, the award wheel, the award symbols and terminator(s) are associated with probabilities such that an award symbol or terminator has a greater probability of being implemented in the game than another award symbol or terminator.

In a further embodiment, the award wheel includes several award symbols with relatively low award values and an award symbol with a relatively large award value wherein a player obtains several spins and more awards. This embodiment allows the player to spin the reels a plurality of times before reaching a terminator and provides an average bonus award suitable for conventional paytables.

Although the present invention is discussed relative to a bonus game of a gaming machine, it should be appreciated that the present invention could be employed as a primary game in a gaming device.

It is therefore an advantage of the present invention to provide a gaming device having an award wheel that has a plurality of award symbols and at least one terminator where a player obtains the award designated after each spin of the award wheel until the terminator is indicated.

It is another advantage of the present invention to provide players with several opportunities to spin the award wheel and obtain larger awards.

Other objects, features and advantages of the invention will be apparent from the following detailed disclosure, taken in conjunction with the accompanying sheets of drawings, wherein like numerals refer to like parts, elements, components, steps and processes.

DETAILED DESCRIPTION OF THE INVENTION

Gaming Device and Electronics

Figure 1A:
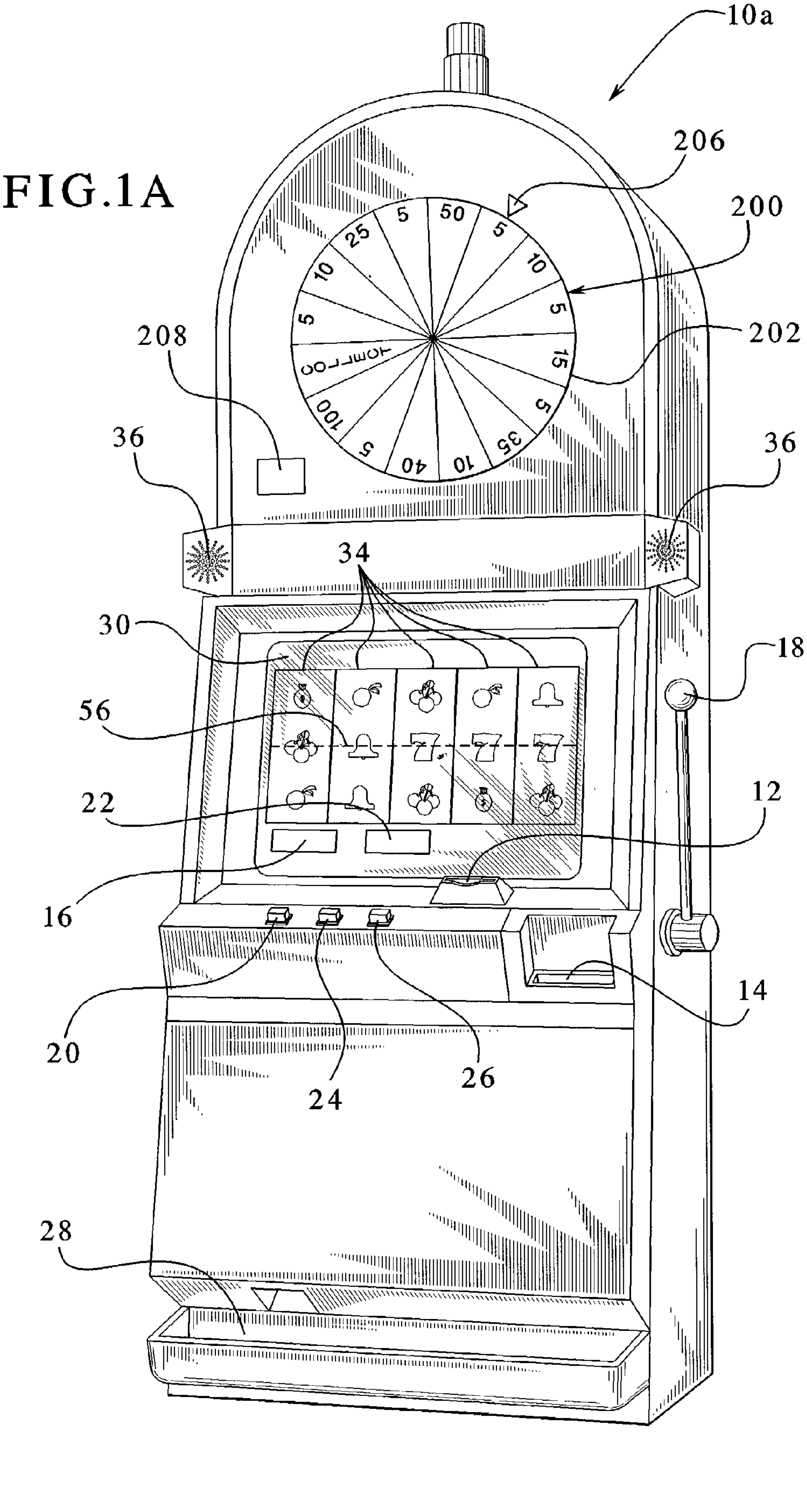
FIG. 1A is a front perspective view of one embodiment of the gaming device of the present invention.
Figure 1B:
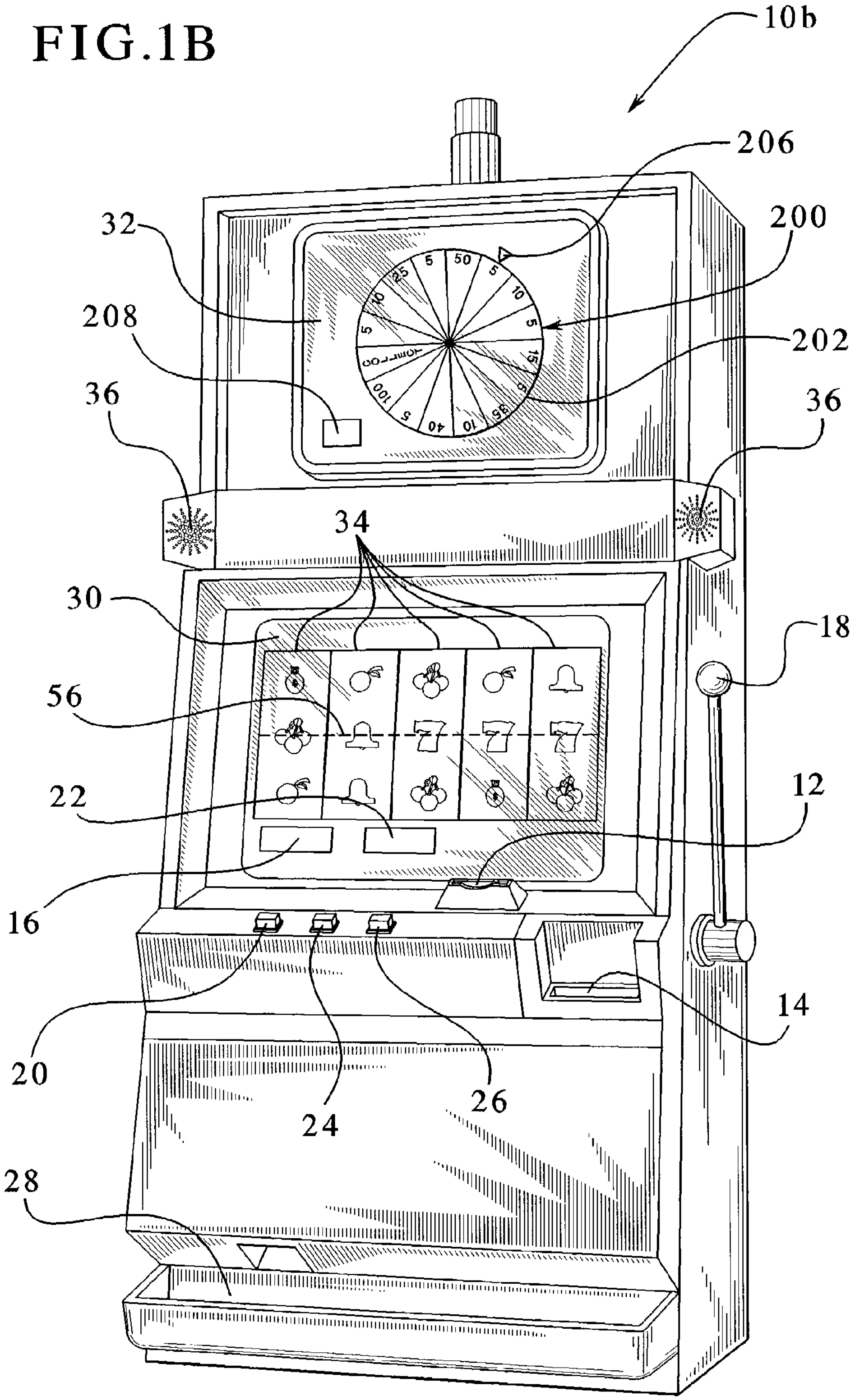
FIG. 1B is a front perspective view of another embodiment of the gaming device of the present invention.

Referring now to the drawings, two embodiments of the gaming device of the present invention are illustrated in FIGS. 1A and 1B as gaming device 10*a* and gaming device 10*b*, respectively. Gaming device 10*a* and/or gaming device 10*b* are generally referred to herein as gaming device 10. Gaming device 10 is preferably a slot machine having the controls, displays and features of a conventional slot machine. It is constructed so that a player can operate it while standing or sitting, and gaming device 10 is preferably mounted on a console. However, it should be appreciated that gaming device 10 can be constructed as a pub-style table-top game (not shown) which a player can operate preferably while sitting. Furthermore, gaming device 10 can be constructed with varying cabinet and display designs, as illustrated by the designs shown in FIGS. 1A and 1B. Gaming device 10 can also be implemented as a program code stored in a detachable cartridge for operating a hand-held video game device. Also, gaming device 10 can be implemented as a program code stored on a disk or other memory device which a player can use in a desktop or laptop personal computer or other computerized platform.

Gaming device 10 can incorporate any primary game such as slot, black, jack, poker or keno, can include any suitable bonus triggering event and any suitable bonus round games. The symbols and indicia used on and in gaming device 10 may be in mechanical, electrical or video form.

As illustrated in FIGS. 1A and 1B, gaming device 10 includes a coin slot 12 and bill acceptor 14 where the player inserts money, coins or tokens. The player can place coins in the coin slot 12 or paper money or ticket vouchers in the bill acceptor 14. Other devices could be used for accepting payment such as readers or validators for credit cards or debit cards. When a player inserts money in gaming device 10, a number of credits corresponding to the amount deposited is shown in a credit display 16. After depositing the appropriate amount of money, a player can begin the game by pulling arm 18 or pushing play button 20. Play button 20 can be any play activator used by the player which starts any game or sequence of events in the gaming device.

As shown in FIGS. 1A and 1B, gaming device 10 also includes a bet display 22 and a bet one button 24. The player places a bet by pushing the bet one button 24. The player can increase the bet by one credit each time the player pushes the bet one button 24. When the player pushes the bet one button 24, the number of credits shown in the credit display 16 decreases by one, and the number of credits shown in the bet display 22 increases by one.

A player may cash out and thereby receive a number of coins corresponding to the number of remaining credits by pushing a cash out button 26. When the player cashes out, the player receives the coins in a coin payout tray 28. The gaming device 10 may employ other payout mechanisms such as credit slips redeemable by a cashier or electronically recordable cards which keep track of the player's credits.

Gaming device 10 also includes one or more display devices. The embodiment shown in FIG. 1A includes a central display device 30 and a mechanical award wheel 200 that physically spins in front of a player. The award wheel is divided into a plurality of sections 202 where a section is indicated by section indicator 206. The alternative embodiment shown in FIG. 1B includes a central display device 30 as well as an upper display device 32. The upper display device 32 displays the award wheel 200 of the present invention in a video format.

Gaming device 10 preferably displays a plurality of reels 34, preferably three to five reels 34 in mechanical or video form at one or more of the display devices. However, it should be appreciated that the display devices can display any visual representation or exhibition, including but not limited to movement of physical objects such as mechanical reels and wheels, dynamic lighting and video images. A display device can be any viewing surface such as glass, a video monitor or screen, a liquid crystal display or any other display mechanism. If the reels 34 are in video form, the display device for the video reels 34 is preferably a video monitor.

Each reel 34 displays a plurality of indicia such as bells, hearts, fruits, numbers, letters, bars or other images which preferably correspond to a theme associated with the gaming device 10. Furthermore, gaming device 10 preferably includes speakers 36 for making sounds or playing music.

Figure 2:
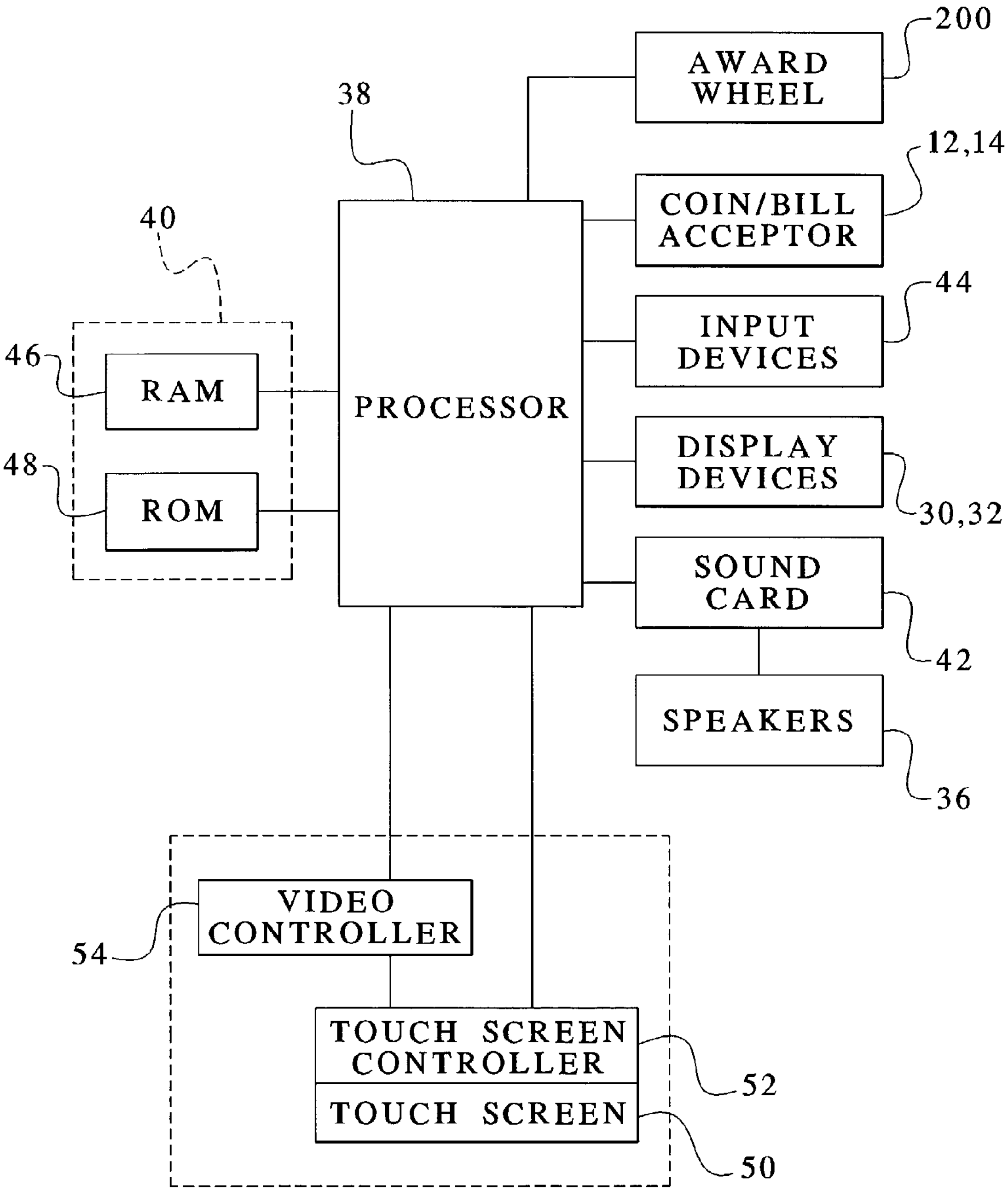
FIG. 2 is a schematic block diagram of the electronic configuration of one embodiment of the gaming device of the present invention.

As illustrated in FIG. 2, the general electronic configuration of gaming device 10 preferably includes: a processor 38; a memory device 40 for storing program code or other data; a central display device 30; an upper display device 32 or an award wheel 200 in the mechanical format of the bonus game; a sound card 42; a plurality of speakers 36; and one or more input devices 44. The processor 38 is preferably a microprocessor or microcontroller-based platform which is capable of displaying images, symbols and other indicia such as images of people, characters, places, things and faces of cards. The memory device 40 can include random access memory (RAM) 46 for storing event data or other data generated or used during a particular game. The memory device 40 can also include read only memory (ROM) 48 for storing program code which controls the gaming device 10 so that it plays a particular game in accordance with applicable game rules and pay tables.

As illustrated in FIG. 2, the player preferably uses the input devices 44, such as pull arm 18, play button 20, the bet one button 24 and the cash out button 26 to input signals into gaming device 10. In certain instances it is preferable to use a touch screen 50 and an associated touch screen controller 52 instead of a conventional video monitor display device. Touch screen 50 and touch screen controller 52 are connected to a video controller 54 and processor 38. A player can make decisions and input signals into the gaming device 10 by touching touch screen 50 at the appropriate places. As further illustrated in FIG. 2, the processor 38 can be connected to coin slot 12 or bill acceptor 14. The processor 38 can be programmed to require a player to deposit a certain amount of money in order to start the game.

It should be appreciated that although a processor 38 and memory device 40 are preferable implementations of the present invention, the present invention can also be implemented using one or more application-specific integrated circuits (ASIC's) or other hard-wired devices, or using mechanical devices (collectively or alternatively referred to herein as a "processor"). Furthermore, although the processor 38 and memory device 40 preferably reside on each gaming device 10 unit, it is possible to provide some or all of their functions at a central location such as a network server for communication to a playing station such as over a local area network (LAN), wide area network (WAN), Internet connection, microwave link, and the like. The processor 38 and memory device 40 is generally referred to herein as the "computer" or "controller."

With reference to FIGS. 1A, 1B and 2, to operate the gaming device 10 in one embodiment the player must insert the appropriate amount of money or tokens at coin slot 12 or bill acceptor 14 and then pull the arm 18 or push the play button 20. The reels 34 will then begin to spin. Eventually, the reels 34 will come to a stop. As long as the player has credits remaining, the player can spin the reels 34 again. Depending upon where the reels 34 stop, the player may or may not win additional credits.

In addition to winning credits in this manner, preferably gaming device 10 also gives players the opportunity to win credits in a bonus round. This type of gaming device 10 will include a program which will automatically begin a bonus round when the player has achieved a qualifying condition in the game. This qualifying condition can be a particular arrangement of indicia on a display device. The gaming device 10 preferably uses a video-based central display device 30 to enable the player to play the bonus round. Preferably, the qualifying condition is a predetermined combination of indicia appearing on a plurality of reels 34. As illustrated in the five reel slot game shown in FIGS. 1A and 1B, the qualifying condition could be the number seven appearing on three adjacent reels 34 along a payline 56. It should be appreciated that the present invention can include one or more paylines, such as payline 56, wherein the paylines can be horizontal, diagonal or any combination thereof.

Bonus Game

Figure 3:
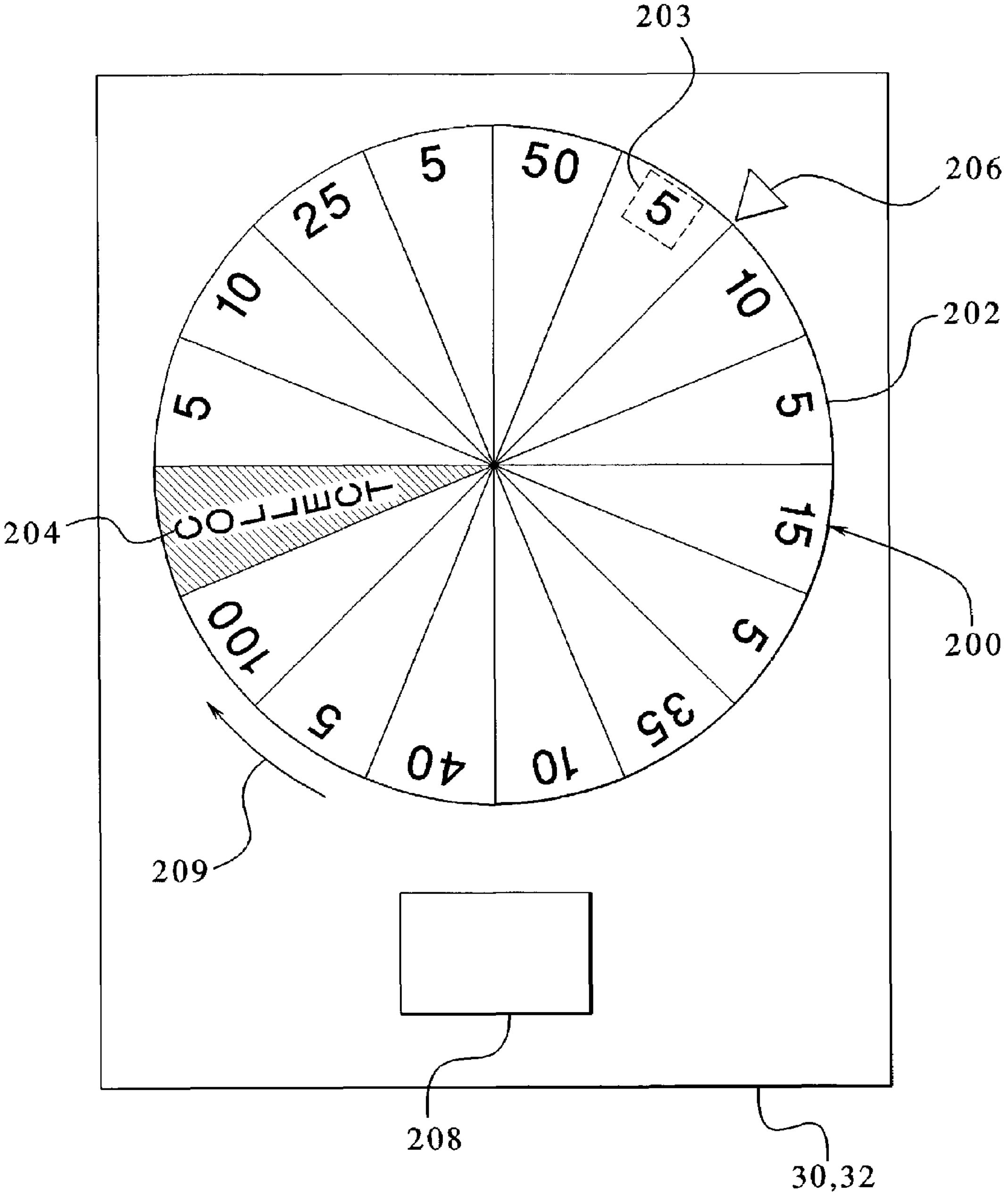
FIG. 3 is an enlarged front plan view of a display device illustrating one embodiment of the present invention wherein the award wheel has one terminator.

Referring now to FIG. 3, the gaming device 10 includes an award wheel 200. In one embodiment, the award wheel 200 is displayed on a video display device such as display device 32 in FIG. 1B. In another embodiment, the award wheel is a mechanical wheel that is physically attached to the gaming device as illustrated in FIG. 1A. The award wheel 200 is divided into or includes a plurality of pie-shaped sections 202. Any suitable number of sections may be employed by the implementor of the gaming device of the present invention. An award or award symbol 203 is on or otherwise associated with each section 202, except for one section which includes a terminator symbol 204. In one embodiment, a number of bonus credits is associated with each award symbol 203. However, it should be appreciated that an award does not have to be associated with each section and that a multiplier, zero award, negative award or other type of modifier may be associated with one or more sections of the award wheel. In operation, the award wheel spins or rotates in a clockwise direction as shown by arrow 209. It should be appreciated that the award wheel can also spin in a counterclockwise direction if desired. It should also be appreciated that the award wheel and sections thereof may be different shapes and sizes. For instance, the terminator symbol may be larger than the other sections.

The terminator symbol or terminator 204 ends the bonus game. The terminator 204 in FIG. 3 is designated by the word "COLLECT," however, the terminator may be designated by any word, symbol, image or sound desired by the game implementor. The award wheel 200 illustrated in FIG. 3 includes one terminator 204, however, the award wheel may include a plurality of terminators as further discussed below.

An indicator 206 is positioned adjacent to the outer edge of the award wheel 200. The indicator 206 indicates or points to one of the sections 202 of the award wheel 200. In FIG. 3, the indicator 206 is an arrow-shaped component that engages the outer edge of the award wheel 200. It should be appreciated that the indicator may also be an illumination device that lights up or highlights a section 202 of the wheel 200 or any other suitable indicator. It should also be appreciated that the award wheel may be stationary and the indicator may move around the wheel. Alternatively, both the award wheel and the indicator may move at different rates, or in different directions or at different rates in different directions.

The gaming device preferably includes a bonus award display 208 which indicates the value of the bonus award that the player has accumulated at each point during the bonus game. If the player obtains a terminator 204, the bonus award identified in the award display 208 is transferred to the player's credit display in a conventional manner.

Figure 4:
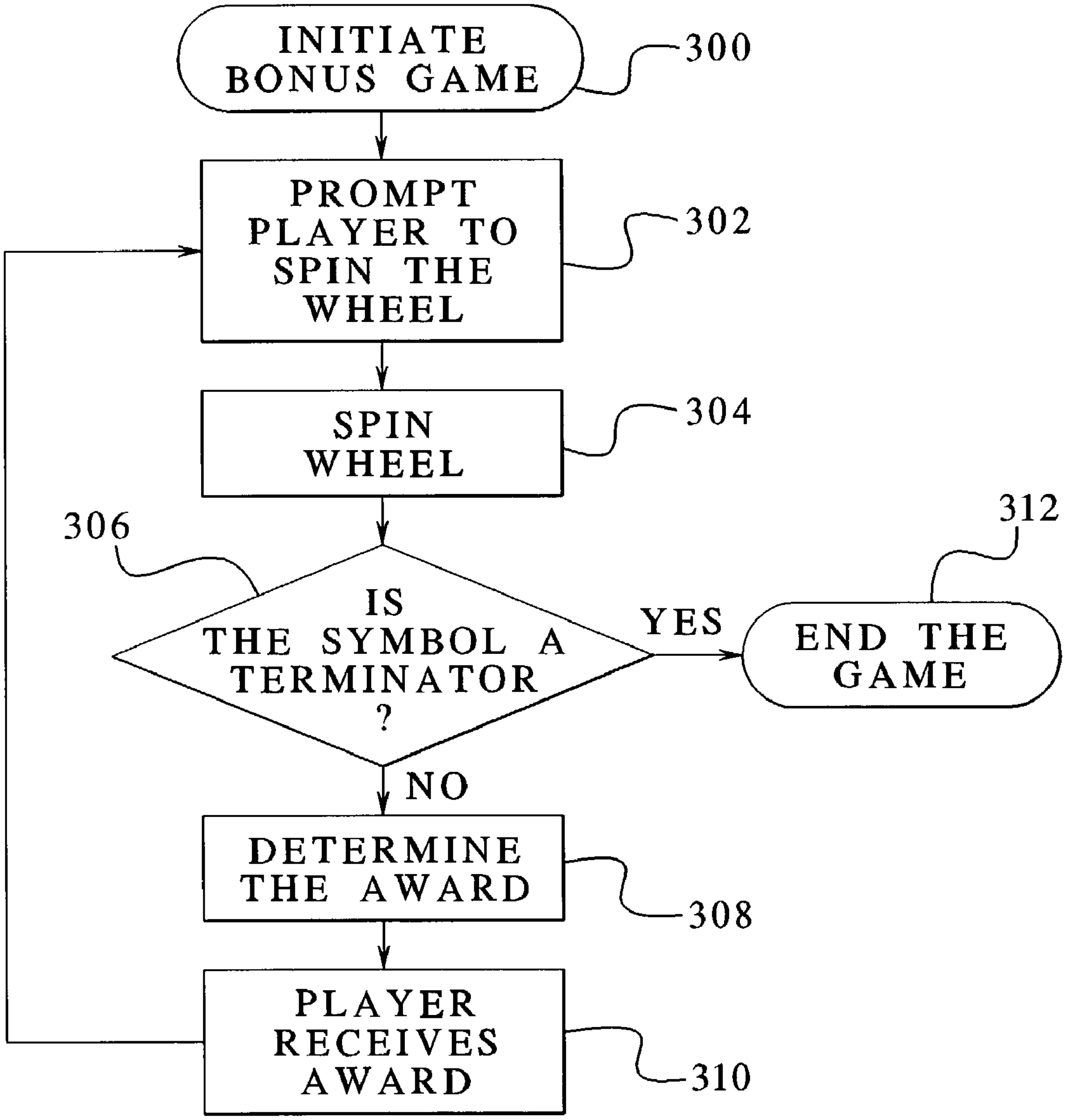
FIG. 4 is a flow diagram of one embodiment of the present invention.

Referring now to FIG. 4, the operation of the bonus game of the present invention is illustrated by a flow diagram. A player initially plays a base game of gaming device 10. In a traditional slot machine gaming device, the player spins a plurality of reels including different symbols usually associated with the theme of the particular gaming device. If the player obtains a bonus triggering symbol or symbol combination, the player initiates the bonus game of the gaming device as indicated by block 300.

In one embodiment of present invention, the gaming device prompts the player to spin the award wheel as indicated by block 302. The prompt is a message displayed on the display device 30 or 32 that instructs the player to spin the award wheel using a button. The prompt may also be a flashing button that alerts the player to spin the award wheel. When the player presses the button, the award wheel begins to spin. It should be appreciated that other suitable prompting techniques or devices may be used by the game implementor as desired. It should also be appreciated that the present invention includes spinning the award wheel without player interaction.

After the player activates the award wheel, the award wheel rotates or spins (as indicated by block 304) in a clockwise direction on the gaming device. When the award wheel stops spinning, the indicator adjacent to the award wheel indicates the section that the player obtained on the wheel. It should be appreciated that the indicator and award wheel are constructed so that the indicator will only point to one section of the award wheel at a time. The gaming device, and more particularly the processor 38 inside the gaming device, determines whether the indicated award wheel section includes an award or a terminator as indicated by decision diamond 306. Alternatively, the processor controls which section will be indicated and knows whether the indicated section has an award symbol, a value associated with the award symbol and a terminator.

If the player obtains an award, the gaming device determines the type of award to provide to the player as indicated by block 308. The award may be bonus values, credits, modifiers such as multipliers, separate bonus games, free spins in the base game or any other awards or prizes. After determining the award type, the gaming device provides the award to the player as indicated by block 310. The gaming device prompts the player to spin the award wheel again as indicated by block 302. The player continues to spin the award wheel until the processor determines that the player obtained a terminator as indicated by decision diamond 306.

If the gaming device determines that the player obtained a terminator, the game ends as indicated by oval 312. The player receives the total of the accumulated awards prior to that spin. The player then returns to the base game of the gaming device.

Figure 5A:
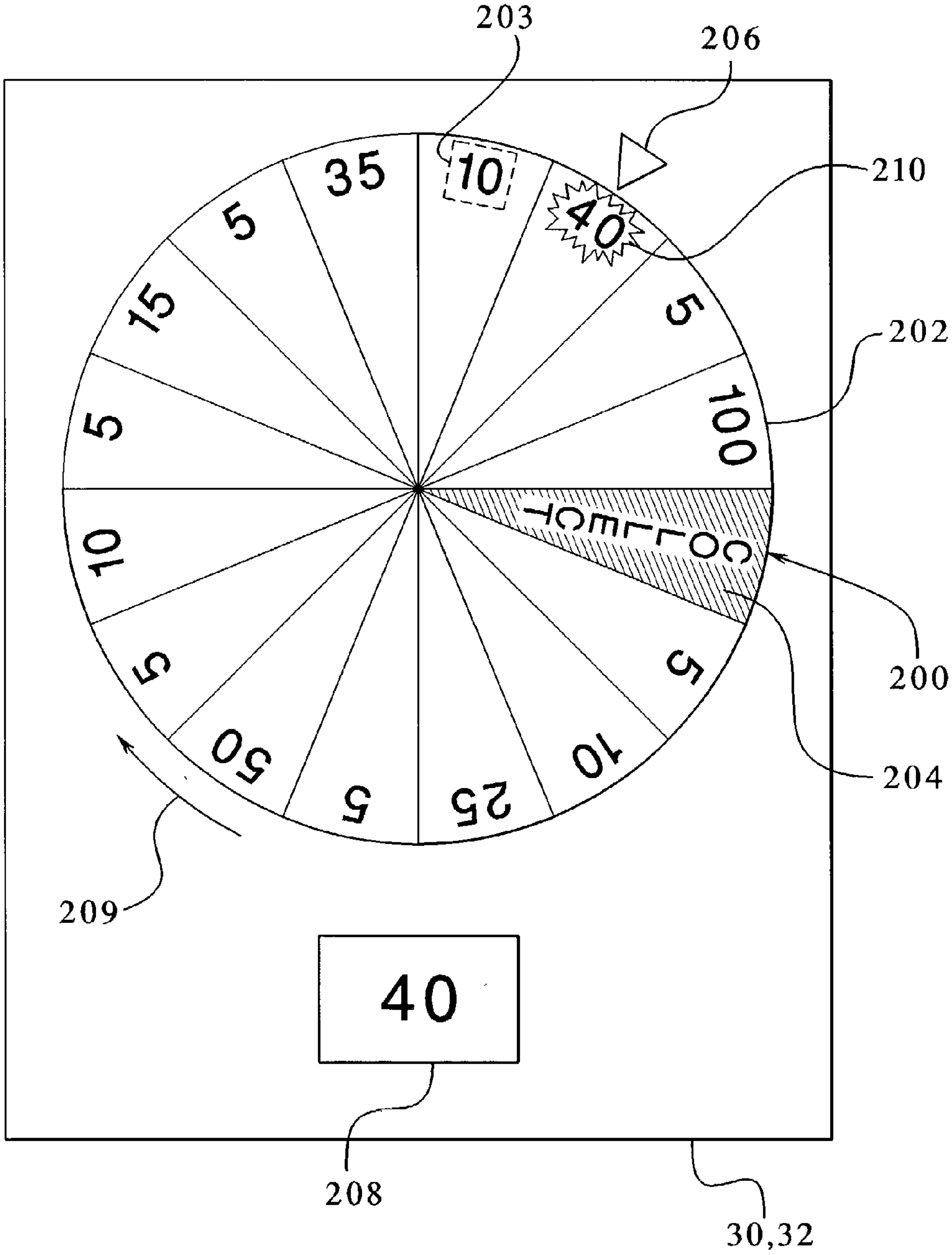
FIGS. 5A to 5C are enlarged front plan views of a display device illustrating an example where a player spins the award wheel three times in a bonus game.
Figure 5B:
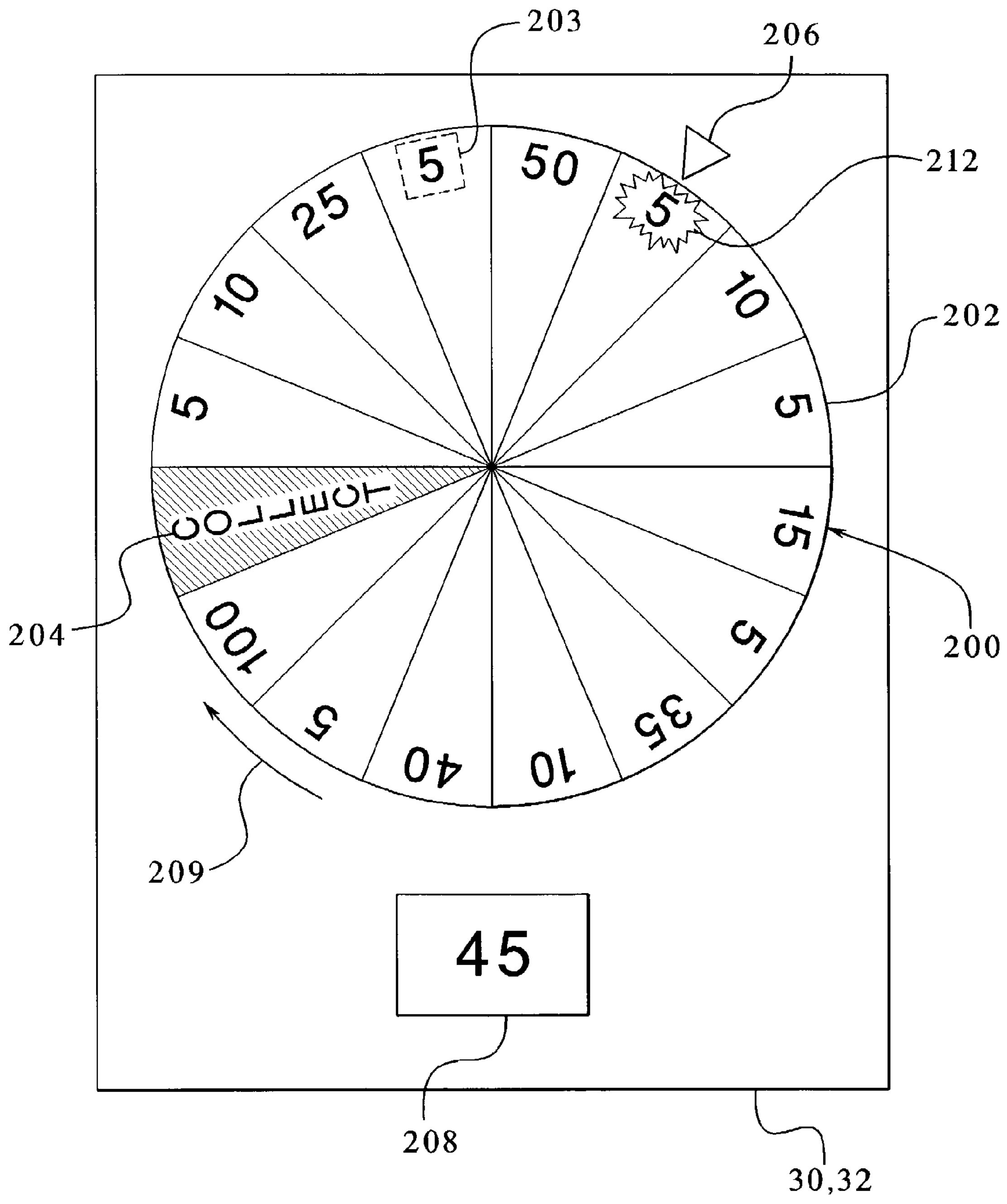
Figure 5C:
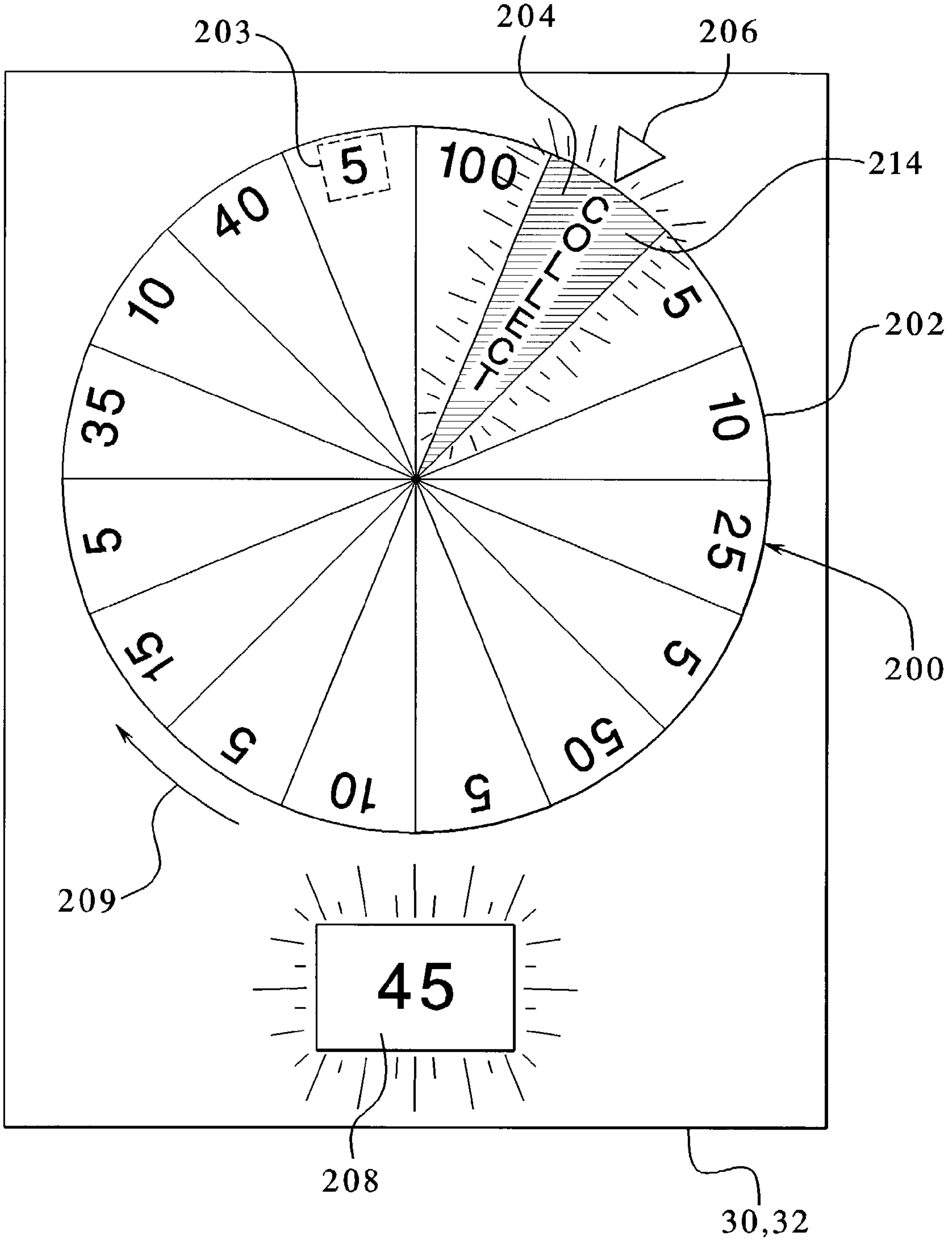

Referring now to FIGS. 5A through 5C, an example of one embodiment of the present invention is illustrated where the player spins the award wheel three times in the bonus game. In this example, the award wheel 200 has several sections 202, one including a terminator 204 and a plurality including award values 203.

In FIG. 5A, the player begins the game by spinning the award wheel 200. The award wheel 200 spins in a clockwise direction as shown by arrow 209. After the award wheel 200 stops spinning, the symbol indicator 206 indicates the section 202 obtained by the player. The indicated section includes an award value of forty after the first spin. Therefore, the award value, forty, is added to the total bonus award for the game displayed in the award display 208. Since this spin was the player's first spin in the bonus game, the player's total award equals the value of the award obtained after the first spin, which is forty. Any awards that the player obtains in subsequent spins are added to this total award shown in award display 208.

Since the player did not obtain a terminator, the gaming device prompts and enables the player to spin the award wheel 200 again. In FIG. 5B, the player spins the award wheel for the second time in the bonus game. After this spin, the indicator 206 indicates a section 202 that includes an award of five. Again the player avoided obtaining a terminator after spinning the award wheel. The player receives the award of five from that spin and the award is added to the total award. The player's new total award is now forty-five after the second spin as indicated by award display 208. The player continues to spin the award wheel 200 until the player obtains a terminator 204.

In FIG. 5C, the player spins the award wheel for a third time in the bonus game. After this spin, however, the player obtains a terminator as indicated by the "collect" symbol in section 204. The bonus game ends and the player receives the total award shown in award display 208. The player's total award in the bonus game is forty-five. FIGS. 5A through 5C illustrate how a player may obtain a large award if they do not obtain a terminator. It should be appreciated that if the player did not obtain the terminator, or in this case the "collect" symbol, the player keeps spinning the award wheel. This provides extended bonus play for players and provides multiple opportunities for a player to receive the largest or best award on the award wheel.

Because there are several different sections 202 including a plurality of awards 203 and one terminator 204, the sections 202 are preferably associated with probabilities or weighted such that one section is more likely than another section. In one embodiment, the sections are equally weighted or associated with equal probabilities. For example, if an award wheel has twenty sections, a player has a $1/20$ or 5% chance of obtaining any one of the sections. Therefore in this embodiment, a player's chances of obtaining any single award section is equal to the chance of obtaining the terminator section.

In another embodiment, the probabilities change after each spin of the award wheel or a designated number of spins of the award wheel. Thus, sections on the award wheel start a bonus game having predetermined probabilities and then the probabilities change after each spin by a player. For example, at the beginning of a bonus game the player has a 5% chance of obtaining any section on an award wheel having twenty sections. After the player's first spin, the player receives an award. The processor alters the probabilities so that the player has a 10% chance of obtaining-the terminator and approximately a 4.74% chance of obtaining any other section on the wheel. Thereafter, the probabilities continue to change after each subsequent spin by the player.

It should appreciated that the probability of the terminator occurring may decrease and the probabilities of the awards may increase after a spin or number of spins, or the awards and terminator may alternately increase and decrease after each spin, a predetermined number of spins, a randomly determined number of spins, or change according to whatever suitable probability scheme is desired by the game implementor. It should also be appreciated that the section probabilities may change after the first spin only and remain the same the rest of the bonus game or change after any number of spins desired.

In another embodiment, the section probabilities change after a predetermined number of spins of the award wheel. In this embodiment, the implementor sets the probabilities to change after a certain number of spins so that a section having a terminator is more likely or a section having a large award is less likely the further the player goes into a bonus game. By adjusting the section probabilities in this manner, the game implementor limits the award amounts that the gaming device pays to players. It also limits the likelihood that a player will obtain the one substantially large award on a spin of the award wheel.

For example, an award wheel has twenty sections and a player starts the bonus game with a 5% probability of obtaining each section on the wheel. Before the fourth spin of the award wheel, the section probabilities are programmed to change so that there is a 15% chance of obtaining the terminator and approximately a 4.47% chance of obtaining each award section. Now the player is more likely to obtain a terminator with each subsequent spin than any single award section.

Similarly, a bonus game could be programmed to decrease the probability of obtaining a large award section after a certain number of spins. Therefore, a player still has the possibility of obtaining the large award, but the probability is less. For example, an award wheel having ten sections, including one terminator and one large award section, starts a bonus game where a player has an equal probability (i.e. 10%) of obtaining each section on the award wheel. The gaming device is programmed to decrease the probability of obtaining the large award section after five spins to 1%. Therefore, after five successful spins of the award wheel, the probability of obtaining the large award section decreases to 1% and the probabilities of obtaining any one of the other nine sections increases to 11%.

In a further embodiment, total awards or award payouts in a bonus game are associated with probabilities. In this embodiment, the processor of the gaming device is programmed so that higher awards are less likely than lessor awards, or vice versa, in a bonus game. Therefore the game implementor controls the award amounts that are paid out by the gaming device without affecting the player's excitement and enjoyment of playing the game. For example, a processor is programmed to award values of zero through fifty in 60% of the bonus games, 51 through 100 in 30% of the bonus games and over 100 in only 10% of the bonus games in a particular gaming device. Based on the probabilities, the processor picks a total award value for the bonus game and subsequently determines the number of spins and the award amounts for each spin for the game. Thus, the total award is predetermined before the game ever starts, yet the player plays the bonus game as if the award is still to be determined.

In each of the above embodiments, the players always have an opportunity or chance or the appearance of an opportunity or chance to obtain each section on the award wheel whether the section includes a terminator or an award. Therefore, although the section probabilities may change in a bonus game, the players maintain their excitement and enjoyment of the bonus game.

Figure 6:
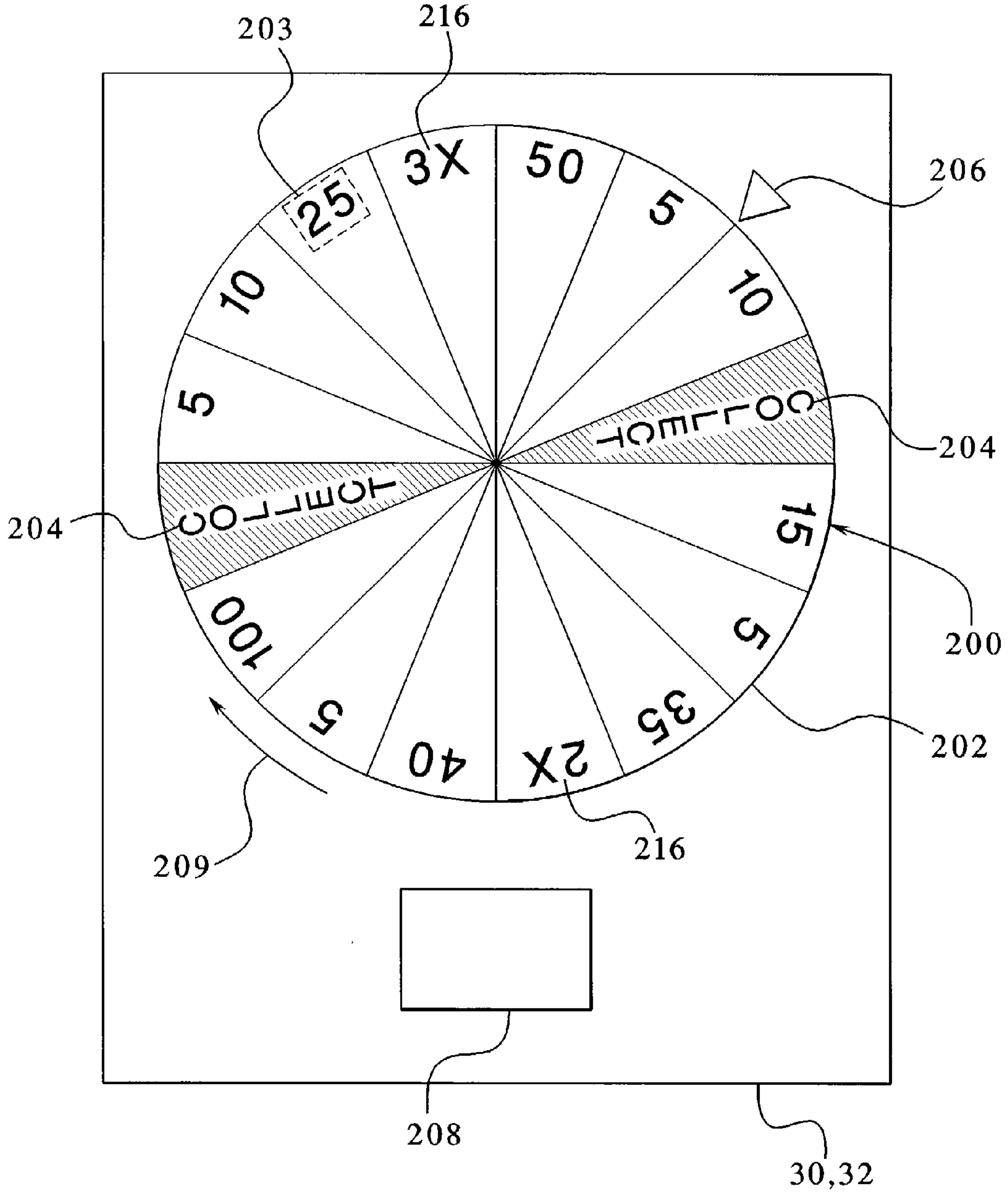
FIG. 6 is an enlarged front plan view of a display device illustrating one embodiment of the present invention where the award wheel has multiple terminators.

Referring now to FIG. 6, another embodiment of the present invention is illustrated where the award wheel 200 has multiple terminators 204 and different types of awards. The terminators are designated by the word "COLLECT" on sections 202. The additional terminators increase the probability or likelihood that a player will obtain a terminator 204 before obtaining an award. In the embodiment where there is an equal likelihood of obtaining each section, the chance of obtaining a terminator increases when one or more additional terminators are added to the award wheel and thus, the average payout decreases. Furthermore, the sections include award values and multipliers. The multipliers substantially increase a player's award and therefore provide excitement to players in the bonus game. It should be appreciated that other types of awards may be used as indicated above.

Figure 7:
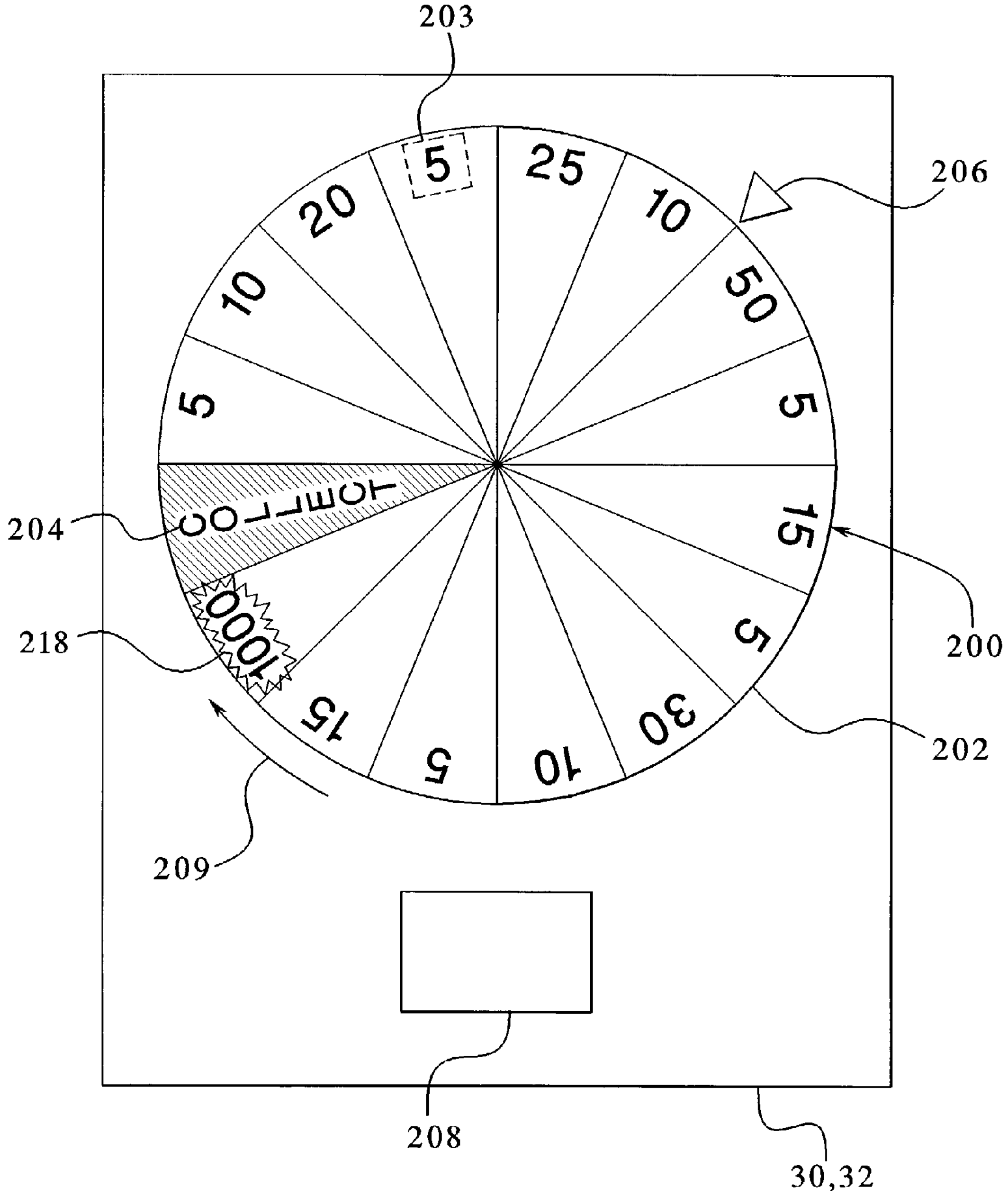
FIG. 7 is an enlarged front plan view of a display device illustrating another embodiment of the present invention where the award wheel includes several relatively low award values and one large award value.

Referring now to FIG. 7, another embodiment of the present invention is illustrated where the award wheel sections 202 include a plurality of low value awards, a terminator and at least one large value award. The probability of obtaining each low value award is preferably greater than the probability of obtaining the large value award or the terminator. In this embodiment, the award wheel 200 has several lower awards ranging from five to fifty, one large award of one thousand and a terminator. The award disparity creates enhanced levels of excitement for players because the player may obtain the large award. Additionally, the player is likely to obtain multiple spins in the bonus game because the probability of obtaining a low value award is substantially higher than obtaining the terminator. Thus, each additional spin increases the players excitement and enjoyment of the game because each spin means an additional opportunity to obtain the large award. Even if the player does not obtain the large award, the player still obtains several awards in the bonus game and may accumulate a large award before obtaining a terminator 204. Thus, the lower values extend the period of the bonus game without substantial change in the pay table. The prolonged playing period increases the player's excitement and enjoyment of the bonus game.

While the present invention is described in connection with what is presently considered to be the most practical and preferred embodiments, it should be appreciated that the invention is not limited to the disclosed embodiments, and is intended to cover various modifications and equivalent arrangements included within the spirit and scope of the claims. Modifications and variations in the present invention may be made without departing from the novel aspects of the invention as defined in the claims, and this application is limited only by the scope of the claims.

The invention is claimed as follows:

1. A gaming device operable under control of a processor, said gaming device comprising:

a bonus game controlled by said processor and initiated upon the occurrence of a triggering event in a primary game, said bonus game including:

a wheel having a plurality of sections;

a plurality of award symbols on a plurality of said sections of said wheel;

a plurality of awards associated with said award symbols;

a terminator symbol on one of said sections of said wheel; and a section indicator, wherein said processor is operable to cause one of said wheel and said section indicator to repeatedly move in a single play of the bonus game to indicate sections on the wheel until the section indicated includes any terminator symbol, wherein for each movement the section having the terminator symbol can be indicated, and operable to automatically provide a player any award associated with said award symbol on each section indicated in the bonus game until the section indicated includes any terminator symbol, wherein said terminator symbol does not eliminate any of the awards provided to the player before the indication of the terminator symbol.

2. The gaming device of claim 1, which includes a probability of being indicated associated with each section, wherein the processor determines the section indicated based on said probabilities.

3. The gaming device of claim 2, wherein a plurality of said probabilities are the same.

4. The gaming device of claim 2, wherein all of said probabilities are the same.

5. The gaming device of claim 2, wherein the probability associated with the section which includes said terminator symbol is higher than the probability associated with at least one section which includes an award symbol.

6. The gaming device of claim 2, wherein the probability associated with the section which includes said terminator symbol is higher than the probabilities associated with a plurality of sections which include an award symbol.

7. The gaming device of claim 2, wherein the probability associated with the section which includes said terminator symbol is higher than the probabilities associated with all of the sections which include award symbols.

8. The gaming device of claim 1, wherein said awards have probabilities of being provided to said player, wherein the processor determines the section indicated based on said probabilities.

9. The gaming device of claim 8, wherein a plurality of said probabilities are different.

10. The gaming device of claim 1, wherein at least one of said award symbols and said terminator symbol have different probabilities of being provided to said player.

11. The gaming device of claim 1, which includes probabilities associated with said terminator symbol and said awards symbols such that the terminator symbol has a greater probability of being indicated by said selection indicator than at least one of said award symbols.

12. The gaming device of claim 1, which includes a plurality of potential total awards, whereby said processor picks one of said total awards and repeatedly indicates sections on the wheel having award symbols until said awards associated with said award symbols on said sections indicated accumulate to said total award.

13. The gaming device of claim 12, wherein said total awards are associated with probabilities such that one of said total awards has a higher probability of being selected by said processor than another of said total awards.

14. The gaming device of claim 1, wherein said section indicator is an illumination device that lights up or highlights an award symbol or terminator symbol on said sections of said wheel.

15. The gaming device of claim 1, wherein a plurality of said sections include a terminator symbol.

16. The gaming device of claim 15, which includes probabilities associated with said terminator symbols and said award symbols such that at least one of the sections having the terminator symbols has a greater probability of being indicated by said section indicator than at least one of said sections having award symbols.

17. The gaming device of claim 1, which includes a spin initiator connected to said processor for enabling the player to cause the processor to initiate each movement of one of said wheel and said section indicator.

18. A gaming device operable under control of a processor, said gaming device comprising:

a bonus game controlled by said processor and initiated upon the occurrence of a triggering event in a primary game, said bonus game including:

a wheel having a plurality of sections;

a plurality of award symbols on a plurality of said sections of said wheel;

a plurality of awards associated with said award symbols;

a terminator symbol on one of said sections of said wheel;

a section indicator; and a probability associated with each of said sections, wherein one of said sections has a greater probability of being indicated by said section indicator than another of said sections, wherein said processor is operable to cause one of said wheel and said section indicator to repeatedly move in a single play of the bonus game to indicate a section on the wheel based on said probabilities until the section indicated includes any terminator symbol, wherein for each movement the section having the terminator symbol can be indicated, and operable to automatically provide a player any award associated with said award symbol on each section indicated in the bonus game until the section indicated includes any terminator symbol, wherein said terminator symbol does not eliminate any of the awards provided to the player before the indication of the terminator symbol.

19. The gaming device of claim 18, wherein the probability associated with the section which includes said terminator symbol is higher than the probability associated with at least one section which includes an award symbol.

20. The gaming device of claim 18, wherein the probability associated with the section which includes said terminator symbol is higher than the probabilities associated with a plurality of sections which include an award symbol.

21. The gaming device of claim 18, wherein the probability associated with the section which includes said terminator symbol is higher than the probabilities associated with all of the sections which include award symbols.

22. A gaming device operable under control of a processor, said gaming device comprising:

a bonus game controlled by said processor and initiated upon the occurrence of a triggering event in a primary game, said bonus game including:

a wheel having a plurality of sections;

a plurality of award symbols on a plurality of said sections of said wheel;

a plurality of low value awards and at least one large value award associated with said award symbols;

a probability associated with each said low value award and large value award, wherein said probability associated with said large value award is lower than the probabilities associated with said low value awards;

a terminator symbol on one of said sections of said wheel; and a section indicator, wherein said processor is operable to cause one of said wheel and said section indicator to repeatedly move in a single play the bonus game to indicate a section on the wheel based on said probabilities until the section indicated includes any terminator symbol, wherein for at least one movement each of the plurality of sections can be indicated, and operable to automatically provide a player any award associated with said award symbol on each section indicated in the bonus game until the section indicated includes any terminator symbol, wherein said terminator symbol does not eliminate any award provided to the player prior to the indication of the terminator symbol.

23. A method for operating a gaming device, said method comprising the steps of:

(a) enabling a player to spin an award wheel including award symbols and at least one terminator symbol;

(b) automatically providing an award to the player if an award symbol is indicated; and (c) repeating (a) and (b) in a single play of a game until a terminator symbol on the award wheel is indicated, wherein said terminator symbol does not eliminate any award provided to the player prior to the indication of the terminator symbol and wherein for each spin the terminator symbol can be indicated.

24. The method of claim 23, wherein said award symbols and at least one terminator symbol are associated with probabilities of being indicated such that each of said award symbols have a lower probability of being indicated than said terminator symbol.

25. The method of claim 23, wherein said award symbols and at least one terminator symbol are associated with probabilities such that said terminator has a greater probability than each of said award symbols.

26. The method of claim 23, wherein said award is bonus values, credits, modifiers or free spins.

27. The method of claim 23, which includes a probability of indicating the terminator, wherein the probability changes after at least one spin.

28. The method of claim 27, wherein the probability changes after each spin.

29. The method of claim 27, wherein the probability changes after a predetermined number spins.

30. The method of claims 23, which is operated through a data network.

31. The method of claim 30, wherein the data network is an internet.

32. A gaming device operable under control of a processor, said gaming device comprising:

a bonus game controlled by said processor and initiated upon the occurrence of a triggering event in a primary game, said bonus game including:

a wheel having a plurality of sections;

a plurality of award symbols on a plurality of said sections of said wheel;

a plurality of awards associated with said award symbols;

a terminator symbol on one of said sections of said wheel; and a section indicator, wherein said processor is operable to cause one of said wheel and said section indicator to repeatedly move in a single play of the bonus game to indicate sections on the wheel until the section indicated includes any terminator symbol, and operable to automatically provide a player any award associated with said award symbol on each section indicated in the bonus game until the section indicated includes any terminator symbol, wherein said terminator symbol does not eliminate any of the awards provided to the player before the indication of the terminator symbol, wherein a probability of being indicated is associated with each section, wherein the processor determines the section indicated based on said probabilities and wherein a plurality of said probabilities are the same.

33. A gaming device operable under control of a processor, said gaming device comprising:

a bonus game controlled by said processor and initiated upon the occurrence of a triggering event in a primary game, said bonus game including:

a wheel having a plurality of sections;

a plurality of award symbols on a plurality of said sections of said wheel;

a plurality of awards associated with said award symbols;

a terminator symbol on one of said sections of said wheel; and a section indicator, wherein said processor is operable to cause one of said wheel and said section indicator to repeatedly move in a single play of the bonus game to indicate sections on the wheel until the section indicated includes any terminator symbol, and operable to automatically provide a player any award associated with said award symbol on each section indicated in the bonus game until the section indicated includes any terminator symbol, wherein said terminator symbol does not eliminate any of the awards provided to the player before the indication of the terminator symbol, wherein a probability of being indicated is associated with each section, wherein the processor determines the section indicated based on said probabilities and wherein all of said probabilities are the same.

34. A gaming device operable under control of a processor, said gaming device comprising:

a bonus game controlled by said processor and initiated upon the occurrence of a triggering event in a primary game, said bonus game including:

a wheel having a plurality of sections;

a plurality of award symbols on a plurality of said sections of said wheel;

a plurality of awards associated with said award symbols;

a terminator symbol on one of said sections of said wheel; and a section indicator, wherein said processor is operable to cause one of said wheel and said section indicator to repeatedly move in a single play of the bonus game to indicate sections on the wheel until the section indicated includes any terminator symbol, and operable to automatically provide a player any award associated with said award symbol on each section indicated in the bonus game until the section indicated includes any terminator symbol, wherein said terminator symbol does not eliminate any of the awards provided to the player before the indication of the terminator symbol, wherein a probability of being indicated is associated with each section, wherein the processor determines the section indicated based on said probabilities and wherein the probability associated with the section which includes said terminator symbol is higher than the probabilities associated with all of the sections which include award symbols.

35. A gaming device having a bonus game comprising:

a wheel having a plurality of sections;

a plurality of award symbols on a plurality of said sections of said wheel;

a plurality of awards associated with said award symbols;

a terminator symbol on one of said sections of said wheel;

a section indicator; and a processor for causing one of said wheel and said section indicator to repeatedly move in a single play of the bonus game to indicate sections on the wheel until the section indicated includes any terminator symbol, and for providing a player any award associated with said award symbol on each section indicated in the bonus game until the section indicated includes any terminator symbol, wherein said terminator symbol does not eliminate any of the awards provided to the player before the indication of the terminator symbol, wherein the gaming device includes a plurality of potential total awards, whereby said processor picks one of said total awards and repeatedly indicates sections on the wheel having award symbols until said awards associated with said award symbols on said sections indicated accumulate to said total award.

36. The gaming device of claim 35, wherein said total awards are associated with probabilities such that one of said total awards has a higher probability of being selected by said processor than another of said total awards.

37. A gaming device operable under control of a processor, said gaming device comprising:

a bonus game controlled by said processor and initiated upon the occurrence of a triggering event in a primary game, said bonus game including:

a wheel having a plurality of sections;

a plurality of award symbols on a plurality of said sections of said wheel;

a plurality of awards associated with said award symbols;

a terminator symbol on one of said sections of said wheel;

a section indicator; and a probability associated with each of said sections, wherein one of said sections has a greater probability of being indicated by said section indicator than another of said sections, wherein said processor is operable to cause one of said wheel and said section indicator to repeatedly move in a single play of the bonus game to indicate a section on the wheel based on said probabilities until the section indicated includes any terminator symbol, and operable to automatically provide a player any award associated with said award symbol on each section indicated in the bonus game until the section indicated includes any terminator symbol, wherein said terminator symbol does not eliminate any of the awards provided to the player before the indication of the terminator symbol and wherein the probability associated with the section which includes said terminator symbol is higher than the probabilities associated with all of the sections which include award symbols.

38. A method for operating a gaming device, said method comprising the steps of:

(a) enabling a player to spin an award wheel including award symbols and at least one terminator symbol;

(b) automatically providing an award to the player if an award symbol is indicated; and (c) repeating (a) and (b) in a single play of a game until a terminator symbol on the award wheel is indicated, wherein said terminator symbol does not eliminate any award provided to the player prior to the indication of the terminator symbol and wherein a probability of indicating the terminator changes after at least one spin.

39. The method of claim 38, wherein the probability changes after each spin.

40. The method of claim 38, wherein the probability changes after a predetermined number spins.

* * * * *